United States Patent Office 2,897,223
Patented July 28, 1959

2,897,223

KETONIC ORGANIC THIOSULFATES

Van R. Gaertner, Dayton, Ohio, assignor to Monsanto Chemical Company, St. Louis, Mo., a corporation of Delaware No Drawing. Application October 15, 1957
Serial No. 690,211

3 Claims. (Cl. 260—453)

The present invention relates to organic thiosulfates having surface-active properties.

According to the invention, there are provided certain alkylaroyalkyl thiosulfates by the reaction of an appropriate α-haloalkyl alkylaryl ketone with an appropriate inorganic thiosulfate substantially according to the scheme

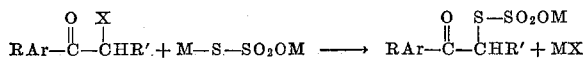

in which R is an alkyl radical of from 8 to 18 carbon atoms, Ar is a benzenoid hydrocarbon radical of from 6 to 10 carbon atoms, X is halogen, R' is selected from the class consisting of hydrogen and alkyl radicals of from 1 to 3 carbon atoms, and M is an inorganic cation selected from the class consisting of alkali metal and ammonium.

The presently provided organic thiosulfates are thus alkali metal or ammonium salts of S-[α-(ar-alkylaroyl)-alkyl] thiosulphates wherein ar denotes substitution in the aromatic ring, the ar-alkyl radical has from 8 to 18 carbon atoms, the other alkyl radical has from 1 to 4 carbon atoms and the aroyl radical has from 7 to 11 carbon atoms.

α-Haloalkyl alkylaryl ketones useful for the preparation of the present organic thiosulfates have from 1 to 4 carbon atoms in the α-haloalkyl radical, from 8 to 18 carbon atoms in the alkyl radical which is a substituent of the aryl radical, and a total of from 14 to 28 carbon atoms in the alkylaryl radical.

A very useful class of the present α-haloalkyl alkylaryl ketones includes α-haloalkyl alkylphenyl ketones such as the ar-alkylphenacyl halides of from 14 to 28 carbon atoms wherein an alkyl has from 8 to 18 carbon atoms. These may be prepared by the reaction of the appropriate alkylbenzene with an appropriate α-haloacyl chloride or α-haloacyl anhydride in the presence of a Friedel-Crafts type catalyst, e.g., as described in my copending application, Serial No. 690,217, filed of even date. Examples of such ketones are, e.g., o-, m- or p-n-octylphenacyl chloride or iodide, o-, m- or p-(2-ethylhexyl)phenacyl chloride or bromide; o-, m- or p-nonylphenacyl chloride or iodide wherein the nonyl radical is derived from propylene trimer; o-, m- or p-n-decylphenacyl bromide or chloride; o-, m- or p-n-dodecylphenacyl chloride or bromide; o-, m- or p-tert-dodecylphenacyl chloride or bromide wherein the tert-dodecyl radical is derived from propylene tetramer or isobutylene trimer; o-, m- or p-tridecylphenacyl chloride or bromide wherein the tridecyl radical is derived from the chloride prepared from the alcohol which is obtained according to the "Oxo" process from carbon monoxide, hydrogen and propylene tetramer or isobutylene trimer; o- m- or p-hexadecylphenacyl chloride or bromide; o-, m- or p-octadecylphenacyl chloride or bromide; ar-n-octyl-ar-propylphenacyl bromide or chloride; ar-tert-dodecyl-ar-methylphenacyl chloride or bromide; ar-n-dodecyl-ar-ethylphenacyl chloride or bromide; ar-n-butyl-ar-octadecylphenacyl chloride, etc. Another presently useful class of α-haloalkyl alkylphenyl ketones includes the α-haloethyl, the α-halopropyl, or the α-halobutyl alkylphenyl ketones having from 8 to 18 carbon atoms in the alkyl radical, e.g., α-chloroethyl o-, m- or p-isoctylphenyl ketone, α-bromoethyl o-, m- or p-tert-dodecylphenyl ketone, α-chloroethyl o-, m- or p-hexadecylphenyl ketone, α-iodopropyl o-, m- or p-n-dodecylphenyl ketone, α-bromopropyl o-, m- or p-branched chain tridecylphenyl ketone, α-chlorobutyl o-, m- or p-undecylphenyl ketone, α-chlorobutyl o-, m- or p-tert-dodecylphenyl ketone, α-bromoethyl ar-hexadecyltolyl ketone, α-chloroethyl ar-tert-dodecyltolyl ketone, α-bromopropyl ar-n-dodecylxylyl ketone, α-chloropropyl ar-tert-dodecyl-ar-propylphenyl ketone, α-bromobutyl ar-butyl-ar-octylphenyl ketone, α-chlorobutyl ar-amyl-ar-hexadecylphenyl ketone, etc.

Still another presently useful class of α-haloalkyl alkylaryl ketones includes the α-haloalkyl alkylnapthyl ketones, e.g., α-chloromethyl, α-bromomethyl or α-iodomethyl n-octyl- or tert-dodecylnaphthyl ketones; α-chloropropyl hexadecylnaphthyl ketone, α-bromoethyl n-dodecylnaphthyl ketone, α-iodobutyl n-octadecylnaphthyl ketone or α-chloropropyl branched chain dodecyl- or branched chain tridecylnaphthyl ketone.

Inorganic thiosulfates which are reacted with the α-haloalkyl alkylaryl ketones to give the present S-[α-(ar-alkylaroyl)-alkyl] thiosulfate salts are sodium, potassium, lithium or ammonium thiosulfate.

Illustrative of the S-[α-(ar-alkylaroyl)alkyl] thiosulfate salts provided by the invention are, e.g., the alkali metal S-[(alkylbenzoyl)methyl] thiosulfates such as sodium S-[(p-octyl-benzoyl)methyl] thiosulfate, potassium S-[(p-n-nonylbenzoyl)methyl] thiosulfate, sodium S-[(ar-tert-dodecyltoluoyl)methyl] thiosulfate, ammonium S-[(ar-tert-dodecyl-ar-dimethylbenzoyl)methyl] thiosulfate, sodium S-[(p-tert-tridecylbenzoyl)methyl] thiosulfate, lithium S-[p-hexadecylbenzoyl)methyl] thiosulfate, sodium S-[α-(p-tert-dodecylbenzoyl)ethyl] thiosulfate, sodium S-[α-(ar-dodecyltoluoyl)-ethyl] thiosulfate, sodium S-[α-ar-dodecyl-ar-dimethylbenzoyl]ethyl thiosulfate, potassium S-[α-(ar-n-octylbenzoyl)propyl] thiosulfate, ammonium S-[α-(ar-tert-dodecyltoluoyl)propyl] thiosulfate, sodium S-[α-(ar-n-dodecyl-n-ethylbenzoyl)-butyl] thiosulfate, sodium S-[α-(p-tert-dodecylbenzoyl)-propyl] thiosulfate, sodium S-[α-(p-tert-dodecylbenzoyl)-butyl] thiosulfate, sodium S-[(α-tert-dodecyl-naphthoyl)-methyl] thiosulfate, potassium S-[α-(β-tert-dodecylnaphthoyl)ethyl] thiosulfate, sodium S-[α-(n-hexadecylnaphthoyl)propyl] thiosulfate, sodium S-[(ar-dodecyl-ar-methylnaphthoyl)methyl] thiosulfate, etc.

Reaction of the presently useful α-haloalkyl alkylaryl ketones with the alkali metal or ammonium thiosulfates takes place readily by contacting a mixture of the two reactants at ordinary or increased temperatures and preferably at a temperature of from, say, 50° C. to 100° C. in the presence or absence of an inert diluent or solvent. Refluxing temperatures are preferred. For smooth reaction, a liquid diluent is generally recommended. Conveniently, this may be a mixture of solvents for the inorganic and organic constituents of the reaction mixture, e.g., a mixture of water and an organic liquid such as ethanol, isopropanol, benzene, acetone, ethyl ether, etc. The by-product alkali metal or ammonium halide is readily removed either by decantation and/or alternate concentration, dissolution and precipitation. An alternative procedure involves extraction of the S-[α-(ar-alkylaroyl)-alkyl] thiosulfate salt with an organic solvent such as isopropanol, acetone, chloroform or tetrahydrofuran, stripping off the solvent from the extract and final oven- or spray-drying.

The present ketonic organic thiosulfates are well defined, stable compounds which range generally from crystalline to waxy solids. While they may be employed for a variety of commercial and agricultural purposes, they are most advantageously used as surface-active materials, i.e., as wetting out, cleansing and lathering agents. Aqueous solutions of very small amounts of the present organic thiosulfate salts foam profusely in both hard and soft water and the lather thus produced has very good stability. They generally possess a very high degree of detersive efficiency, surpassing the majority of commercially available synthetic detergents in this respect. They are thus very useful as either laundering or dish-washing agents; wherein the lathering property, particularly the foam stability, of the present thiosulfates is especially beneficial.

The invention is further illustrated but not limited by the following examples:

*Example 1*

Tert-dodecylbenzene obtained by alkylation of benzene with propylene tetramer was reacted with chloroacetyl chloride in the presence of anhydrous aluminum chloride to yield ar-tert-dodecylphenacyl chloride. This was converted to a thiosulfate as follows:

A mixture consisting of 19.5 g. of the ar-tert-dodecylphenacyl chloride, 20 ml. of an aqueous sodium thiosulfate solution containing 0.060 mole of the thiosulfate, and 30 ml. of ethanol was heated slowly, with stirring, to a temperature of 80° C. and then held at this temperature for an additional 30 minutes. At the end of this time, the resulting reaction mixture was cooled and extracted with 50 ml. of hexane. The residue was allowed to stand overnight and the lower layer which formed was withdrawn and dried by distillation in the presence of isopropanol whereby ethanol-water was stripped off at reduced pressure while being gradually replaced by the isopropanol. The dried product was then treated with charcoal, filtered in the presence of a filter aid and vacuum-dried to give 21.5 g. (88.4% yield) of the substantially pure sodium S-[(tert-dodecylbenzoyl)] thiosulfate.

Wetting out-efficiency of the sodium S-[(tert-dodecylbenzoyl)methyl] thiosulfate was determined according to the procedure of the Draves test of American Association of Textile Chemists. The following wetting-speeds, in seconds, were determined at the concentrations of said thiosulfate shown below:

| | |
|---|---|
| 0.5% | 3.4 |
| 0.25% | 5.7 |
| 0.125% | 12.6 |
| 0.0625% | 47.7 |
| 0.031% | 180+ |

Evaluation of the lathering property of said thiosulfate was made by employing the Ross-Miles lather test of the American Society for Testing Materials. The following results were obtained in water of 300 p.p.m. hardness:

| Lather Height, cm. | |
|---|---|
| At Once | 5 minutes |
| 21.0 | 20.8 |

*Example 2*

In another run, the ar-tert-dodecylphenacyl chloride described in Example 1 was reacted with sodium thiosulfate as follows:

A mixture consisting of 33.9 g. of the chloride, 50 ml. of an aqueous sodium thiosulfate solution containing 0.15 mole of the thiosulfate and 50 ml. of ethanol was brought to a temperature of 40° C. and then heated with stirring up to a temperature of 83° C. during the subsequent 18 minutes. After cooling, the salt layer which formed was removed and the residue was dried by distilling off the water and ethanol at reduced pressure while replacing them with isopropanol. Upon filtering the dried product and allowing the residue to cool, the white crystalline sodium S-[(tert-dodecylbenzoyl)methyl] thiosulfate separated out from the filtrate. This was recovered and the mother liquors worked up by extraction with hot ethanol, drying of the extract with isopropanol as above, filtration and cooling to give an additional yield of the sodium S-[(tert-dodecylbenzoyl)methyl] thiosulfate. A total of 42.8 g. of product was thus obtained. This is labeled Product (I) in the evaluation data shown below. A redried sample of Product (I) analyzed 15.41% sulfur as compared to 15.2%, the calculated value for $C_{20}H_{31}NaO_4S_2$.

The combined liquors from the above isolation procedures were evaporated to dryness to give 24 g. of a gum-like material comprising a mixture of isomeric sodium S-[(tert-dodecylbenzoyl)methyl] thiosulfates. It is labeled Product (II) in the evaluation data shown below.

Evaluation of the wetting-out efficiency of Products (I) and (II) by the Draves test gave the following results:

| | Speed of Wetting, Seconds at percent concentration | | | | | |
|---|---|---|---|---|---|---|
| | 0.5 | 0.25 | 0.125 | 0.0625 | 0.031 | 0.015 |
| Product (I) | 3.0 | 4.3 | 6.4 | 20.5 | 84.0 | 180+ |
| Product (II) | 5.3 | 7.3 | 13.9 | 39.5 | 180+ | |

Evaluation of the latering efficiency of Products (I) and (II) by the Ross-Miles lather test gave the following values in the water hardness:

| | Lather Height, cm. | | | |
|---|---|---|---|---|
| | 50 p.p.m. | | 300 p.p.m. | |
| | at once | 5 min. | at once | 5 min. |
| Product (I) | 17.3 | 16.6 | 20.0 | 19.9 |
| Product (II) | 16.0 | 14.2 | 19.6 | 19.6 |

Detergency tests were conducted according to the method described by Jay C. Harris and Earl L. Brown, J. Amer. Oil Chemists Soc. 27 135–143 (1950), wherein the detersive efficiency of a composition is compared to a commercially available product known as "Gardinol" (sodium lauryl sulfate). Employing this test, Product (I) was found to have 111% of the detersive efficiency of "Gardinol" in water of 50 p.p.m. hardness and 108% of the detersive efficiency of "Gardinol" in water of 300 p.p.m. hardness.

*Example 3*

In still another run, the ar-tert-dodecylphenacyl chloride described in Example 1 was reacted with sodium thiosulfate as follows:

A mixture consisting of 66.8 g. (0.207 mole) of the chloride, 75 ml. of an aqueous sodium thiosulfate solution containing 0.225 mole of the thiosulfate and 75 ml. of ethanol was stirred at room temperature for 70 minutes and then heated with stirring to a temperature of 70° C. within 25 minutes. The resulting reaction mixture was mixed with 100 ml. of isopropanol and decanted from the salt which formed. After distilling off the water-ethanol, the residue was filtered. Upon cooling the filtrate, white crystals of sodium S-[(tert-dodecylbenzoyl)methyl] thiosulfate separated therefrom. The mother liquor obtained from separation of this crystalline product and liquors obtained by re-extraction of the first filter cake were combined and allowed to stand overnight whereupon another crop of crystals crystallized was obtained. Additional product was obtained by working up the mother liquors from this crystallization. The crystal crops were dried in a vacuum oven at 45° C. to give a total of 41 g. of the substantially pure sodium S[(tert-dodecylbenzoyl)methyl] thiosulfate which is labeled Product (III) in the evaluation data given below.

The total liquors obtained in the above isolation procedures were dried at a temperature of below 60° C. to give 47.5 g. of the crude gum-like sodium S-[(tert-dodecylbenzoyl)methyl] thiosulfate which is labeled Product (IV) in the evaluation data given below.

Evaluation of the wetting-out efficiency of Product (III) and Product (IV) by the Draves test gave the following values:

|  | Speed of Wetting, Seconds at percent concentration | | | | | |
| --- | --- | --- | --- | --- | --- | --- |
|  | 0.5 | 0.25 | 1.125 | 0.0625 | 0.031 | 0.015 |
| Product (III) | 3.3 | 4.4 | 6.2 | 22.2 | 77.9 | 180+ |
| Product (IV) | 4.8 | 7.5 | 11.3 | 43.1 | 180+ | |

Evaluation of the detersive efficiency of Product (III) employing the Harris and Brown procedure described in Example 1 gave a detersive efficiency of 105% in water of 50 p.p.m. hardness and 113% in water of 300 p.p.m. hardness, as compared to "Gardinol."

What I claim is:

1. An organic thiosulfate selected from the class consisting of alkali metal and ammonium salts of an S-[α-(ar-alkyl-aroyl)alkyl] thiosulfate wherein the ar-alkyl radical has from 8 to 18 carbon atoms, the other alkyl radical has from 1 to 4 carbon atoms and the aroyl radical has from 7 to 11 carbon atoms.

2. An alkali metal S-[(alkylbenzoyl)methyl] thiosulfate having from 8 to 18 carbon atoms in the alkyl radical.

3. Sodium S-[(tert-dodecylbenzoyl)methyl] thiosulfate.

References Cited in the file of this patent
UNITED STATES PATENTS

| 2,004,873 | Kirstahler et al. | June 11, 1935 |
| 2,012,073 | Schirm | Aug. 20, 1935 |
| 2,402,642 | Lazier et al. | June 25, 1956 |

FOREIGN PATENTS

| 479,897 | Great Britain | Feb. 7, 1938 |

UNITED STATES PATENT OFFICE
CERTIFICATE OF CORRECTION

Patent No. 2,897,223

July 28, 1959

Van R. Gaertner

It is hereby certified that error appears in the above numbered patent requiring correction and that the said Letters Patent should read as corrected below.

Column 3, line 23, for "19:5" read -- 19.5 --; column 3, lines 38 and 39, for "S-[(tertdodecylbenzoyl)]thiosulfate" read -- S-[(tert-dodecylbenzoyl)methyl]thiosulfate --; column 5, in the table, heading to fourth column thereof, for "1.125" read -- 0.125 --.

Signed and sealed this 14th day of November 1961.

(SEAL)
Attest:

ERNEST W. SWIDER
Attesting Officer

DAVID L. LADD
Commissioner of Patents